United States Patent Office 3,447,835
Patented June 3, 1969

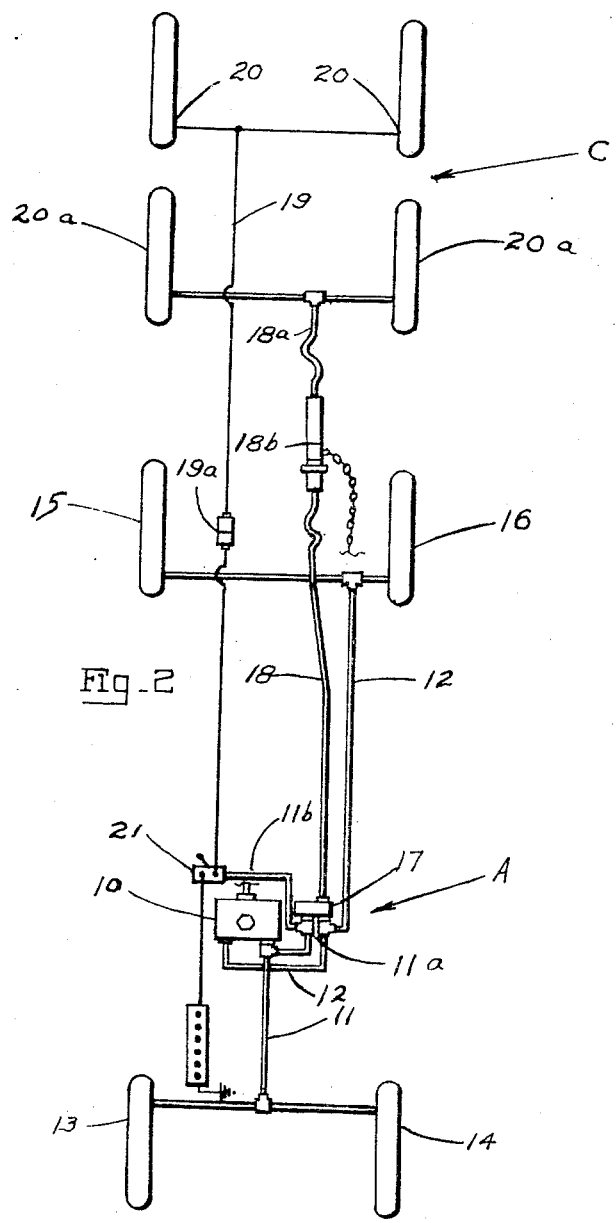

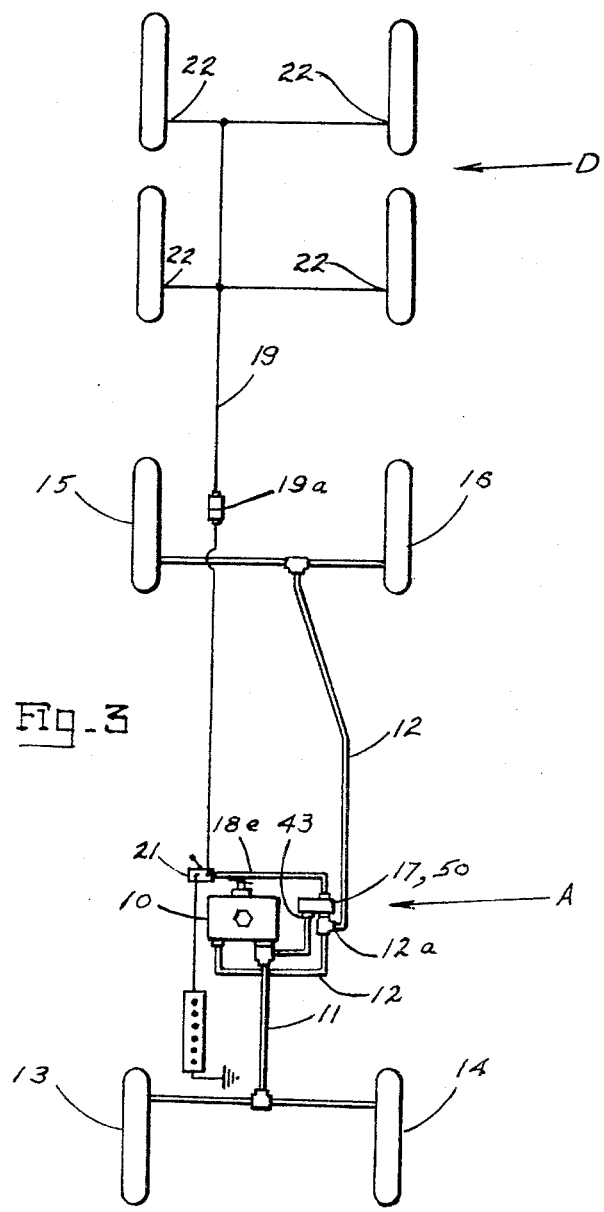

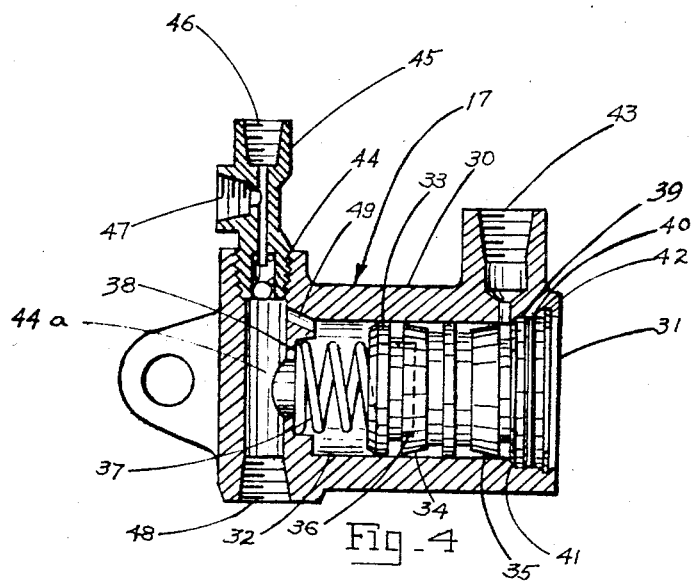
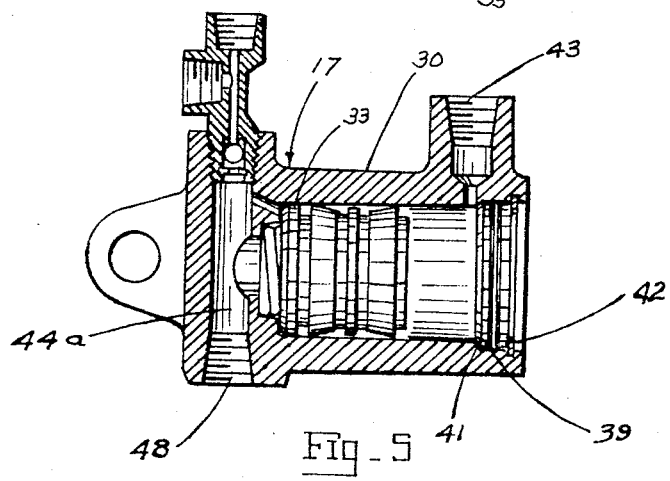
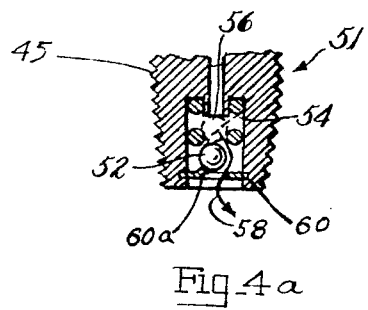

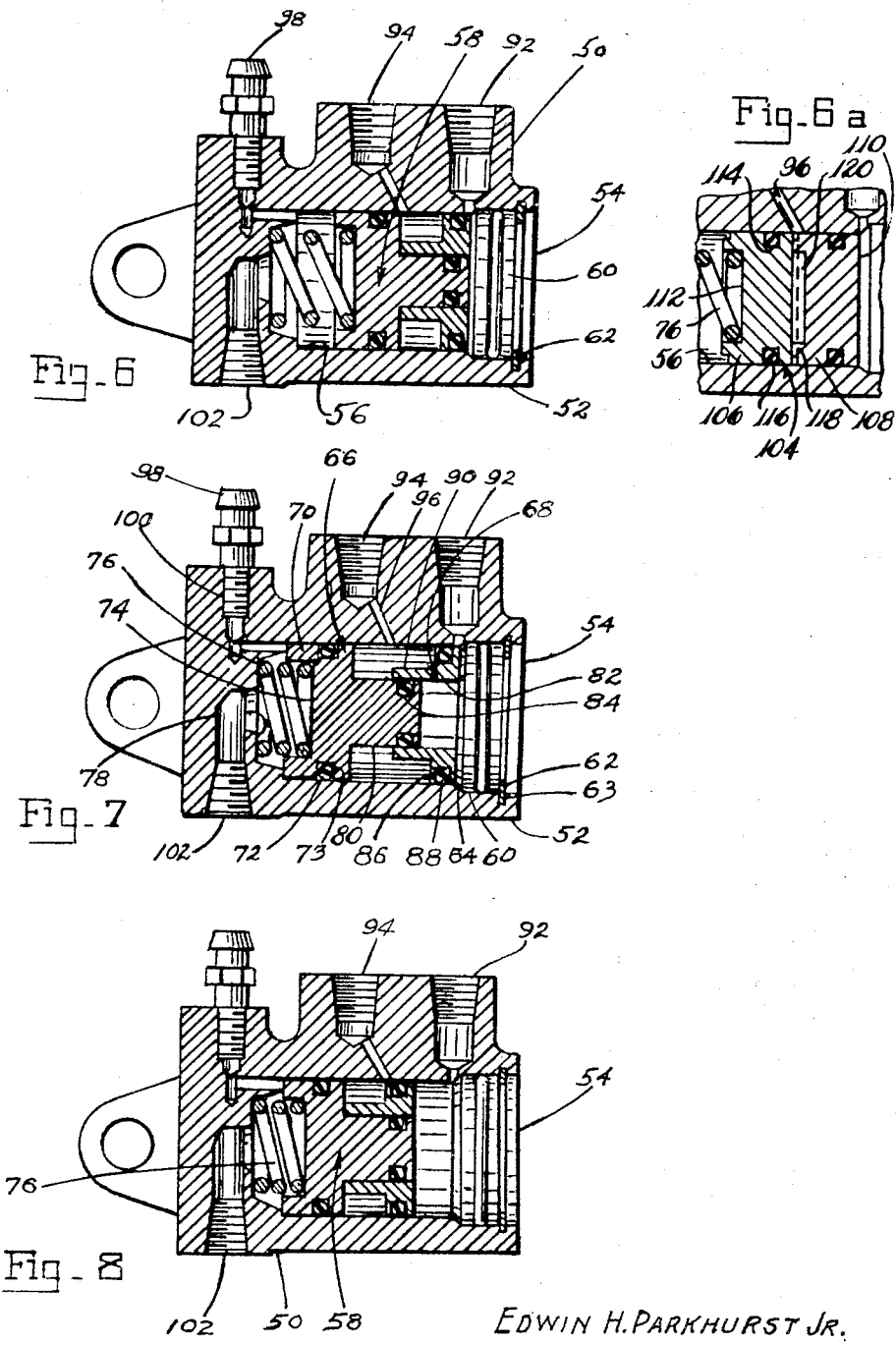

3,447,835
VEHICLE BRAKE SYSTEM AND VALVE
Edwin H. Parkhurst, Jr., 3214 Rumson Road,
Cleveland Heights, Ohio 44118
Filed July 6, 1967, Ser. No. 651,407
Int. Cl. B60t 15/46, 15/16, 17/18
U.S. Cl. 303—7          5 Claims

ABSTRACT OF THE DISCLOSURE

A brake system for a highway trailer, for use with a towing vehicle equipped with a split hydraulic braking system, actuated by a dual master cylinder. The system incorporates an isolation valve, connected to both ends of the split system of the towing vehicle, but is so arranged that it keeps the two ends isolated. In the event of loss of fluid from either end of the braking system of the towing vehicle, the brakes of the trailer will nevertheless be applied for a normal stop. If the connected end of the auto fails, the isolation valve causes the other end to apply pressure for trailer braking.

---

This invention relates to improvements in braking systems for highway trailers and more particularly to braking systems for trailers equipped with hydraulic or electric brakes. Still further this invention relates to an isolation valve per se for use in the aforementioned braking system, in connection with a towing vehicle having a split hydraulic braking system.

THE PROBLEM

The evolution of automobile braking systems has now reached the point of the split system. Thus, a dual master cylinder is used to supply fluid simultaneously through separate circuits to the rear and front wheels respectively of the vehicle. This leads to problems, however, for the towing of vehicles such as trailers.

It is obvious that the trailer brakes cannot be cross connected to both ends of the auto brake system since this would defeat the purpose of the split system. A failure of either end would be telegraphed through the trailer system and entire failure of both the auto and trailer brakes would result.

Therefore, the trailer is conventionally tied into one end only of the auto system. In the event of failure of this half of the auto system, the entire trailer brakes will also be lost, simultaneously. This will throw all of the braking for both the trailer and the auto on the remaining two wheels of the auto. This usually causes the trailer to jack-knife on the auto and produces a dangerous wreck. If the trailer does not jack-knife, the reduced braking may either unbalance the trailer and cause it to upset, or provide such inadequate braking that a collision will result between the towing auto and an obstacle in its path.

In the event of failure of the end of the auto system not tied to the trailer, the possibilities are not so dire, due to the fact that all of the trailer brakes and one end of the auto system are still operable. Trailer braking will tend to pull the auto down in a manner whereby control can be maintained.

Therefore, a substantial step forward in the art would be provided by a braking system for auto towed trailers where, in the event of failure of either end of the auto system, the brakes of the trailer will nevertheless be applied to provide a normal stop.

Accordingly, objects of the present invention are to provide a novel and improved braking system for highway trailers adapted to be towed by automotive vehicles having split hydraulic braking systems.

A further object is to provide an improved braking system for a highway trailer having hydraulic and/or electric brakes.

A further object is to provide a novel isolation valve per se.

A further object is to provide a novel isolation valve for use in a trailer braking system, and with a split auto brake system, which is effective to operate from either end of the split system, while retaining the isolated condition, but automatically uses energy from the operable end of the auto system, in the event of a partial failure, for stopping the trailer with "all wheel" braking on the trailer.

These and other objects and advantages of the invention will appear in the following description and appended claims, taken in conjunction with the drawings forming a part of this specification, wherein:

FIGURE 1 is a schematic view illustrating an all hydraulic system on both the trailer and towing vehicle, with a split hydraulic system on the towing vehicle, and wherein the trailer brakes are normally actuated by one end of the auto system, but wherein the novel isolation valve of the invention makes available the other end of the auto system in event of failure of said one end;

FIGURE 2 is a schematic view similar to FIGURE 1, illustrating a combination hydraulic-electric braking system on the trailer and a split hydraulic system on the towing vehicle, and wherein the hydraulic portion of the trailer brakes is normally actuated by one end of the auto system, but wherein the novel isolation valve of the present invention makes available the other end of the auto system in event of failure of said one end;

FIGURE 3 is a schematic view similar to FIGURE 2, illustrating a completely electric braking system on the trailer and a split hydraulic system on the towing vehicle, and wherein the isolation valve of the invention functions to direct hydraulic fluid pressure to a control switch for the electric system of the trailer to provide a normal stop in the event of failuure of either end of the split system of the auto;

FIGURE 4 is an axial sectional view of one embodiment of the isolation valve of the invention, and showing the piston in its normal, inoperative position;

FIGURE 4a is a fragmentary sectional view of the check valve used in FIGURES 4 and 5;

FIGURE 5 is a sectional view, similar to FIGURE 4, but showing the piston extended to its extreme limit when the brakes are applied, as the result of either a failure in a portion of the braking system of the towing vehicle, or a maladjustment of the brakes causing full displacement of the piston in order to provide enough fluid volume to effect a normal stop;

FIGURE 6 is an axial sectional view of a preferred emobodiment of the isolation valve of the invention, utilizing a dual piston, the piston being shown in its normal, inoperative position;

FIGURE 6a is a fragmentary, axial sectional view of another dual piston arrangement, preferred over FIGURE 6 for economy of manufacture;

Figure 1:
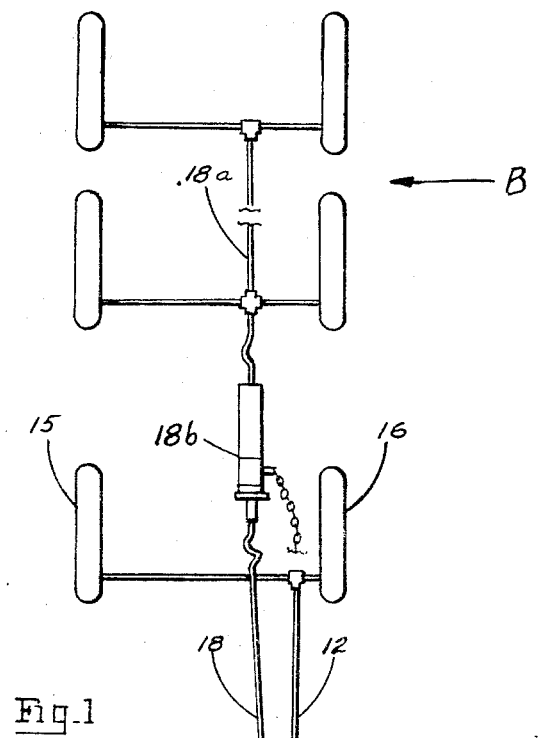

FIGURE 7 is a sectional view similar to FIGURE 6, showing the primary piston extended to its extreme limit when the brakes are applied under normal conditions of operation of the dual master cylinder of the towing vehicle; and FIGURE 8 is a view similar to FIGURES 6 and 7 showing both primary and secondary portions of the dual piston extended, as the result of a failure in the normal actuating segment of the dual master cylinder of the towing vehicle.

My invention provides a substantial contribution to the operation of trailer brakes from the braking system of a towing auto having a split hydraulic braking system. By the present invention there can be a failure in part of the brake system of the auto, yet the trailer can be stopped normally, i.e., with "all wheel" braking.

In another aspect, the system of my invention is operable with both hydraulic and/or electric brakes on the trailer, and these are both adapted to be actuated, using the invention, from a split hydraulic system of a towing auto, yet retaining the fail-safe feature of the split system.

Further, my invention provides an isolation valve of novel structure and of improved simplicity. The valve utilizes a floating piston and provides a standby feature so that in event of failure of a portion of the brake system of the towing auto, a normal stop will be provided for the trailer.

I have thus outlined the general nature of my invention and its relation o the prior art in order that the following description may be better understood, and in order that my contributions to the art can be better appreciated. There are, of course, additional features of the invention that will be described hereinafter. Those skilled in the art will appreciate that the conception upon which the disclosure is based may be utilized as the basis for other structures for carrying out the several purposes of the invention.

FIGURE 1.—THE ALL HYDRAULIC SYSTEM

In this aspect of the invention, an automotive vehicle A is used to tow a trailer B. The auto A has a split hydraulic braking system that is actuated by a dual master cylinder 10. The master cylinder 10 feeds pressurized hydraulic fluid simultaneously to the two separate ends 11 and 12, making up the total auto system A. The end 11 operates the brakes on the front wheels 13 and 14; and the end 12 operates the brakes on the rear wheels 15 and 16. This is current practice.

For purposes of operating the single hydraulic system on the trailer B, I interpose the isolation valve 17 of the present invention into the hydraulic system of the towing auto A, connecting it to each end 11 and 12, but maintaining the ends isolated, in order to comply with present practice and retain the safety feature design of the split system.

The valve 17 serves to direct fluid from only one end of the system A into the trailer system B in order to operate all of the trailer wheel brakes simultaneously. The rear end 12 has been chosen as illustrative for this connection. From the valve 17, lines 18 and 18a and a disconnect 18b serve to feed the brakes of trailer B.

It is important to note that isolation valve 17 provides a reservoir for one shot of fluid so that if there is a failure in the connected end of the auto system A, pressure from the other end of system A will act on the reserve fluid, through a floating piston to be described later, and stop both the auto by the other end brakes and the trailer by full trailer brakes.

The driver will be alerted of the failure by his dashboard warning light, to have the failure repaired before proceeding further. Thus, disastrous accidents are clearly avoided by the present invention, in all instances except total brake failure on the auto A; and the purpose of the split hydraulic system of the auto is to avoid that contingency. Therefore, the combination of the present invention provides a substantial step forward in the art.

The manner in which he isolation valve 17 of the invention serves to provide the reservoir fluid will be brought out in the description relating to FIGURES 4 and 5.

If there is a a failure in the front end system 11 of the auto A, the rear end system 12 will continue to provide normal trailer braking. However, the driver will be alerted of the failure by the warning light to have the malfunction repaired.

FIGURE 2.—THE HYDRAULIC-ELECTRIC SYSTEM ON THE TRAILER

In this aspect of the invention, the towing auto has the same type of split hydraulic braking system A. This includes a dual master cylinder 10, which feeds pressurized hydraulic fluid to the front brakes 13 and 14 by an end 11, and to the rear wheel brakes 15 and 16 by the end 12.

In this aspect of the invention, the isolation valve 17 is used to feed fluid in the same manner from end 12 of the auto A into part of the trailer brake system.

In this embodiment of the invention, the trailer C has a split brake system. Thus, the front wheels 20a include a hydraulic braking portion; and the rear wheels 20 include an electrical braking portion.

The isolation valve 17, of the invention, is connected so that the rear end 12 of the hydraulic system of the auto A feeds fluid to the hydraulic portion of the trailer system C to brake the front wheels 20a. The same connection at the isolation valve 17 is provided as in FIGURE 1, for the front wheels 20a of the trailer C. Lines 18, 18a and disconnect 18b lead from the isolation valve 17 to the front wheels 20a.

The other end 11 of the auto system A is also connected to the isolation valve 17 in the same manner to provide the safety aspect of the isolation valve for the hydraulic portion of the trailer brakes 20a.

Additionally, a T-fitting 11a is placed in line 11 and a line 11b leads to a hydraulically actuated switch 21, which actuates the rear wheels 20 of the trailer C through connecting electrical lines 19 and disconnect 19a. The electrical switch 21 can also be manually operated if desired. In this set up, if there is a failure in end 11, the driver of the auto A has the option of manually controlling the switch 21 for rear trailer braking. The valve 17 will still apply hydraulic fluid to the front wheels 20a of the trailer C and to the rear wheels 15 and 16 of the towing vehicle A.

It will thus be apparent that by the manual use of the electric controller switch 21 and the system 12, 75% braking is retained, e.g., all wheels of the trailer C, and the rear wheels 15 and 16 of the towing vehicle A. Without the manual use of electric controller 21, the operable end 12 will continue to provide brakes for the rear wheels 15 and 16 of the towing vehicle A and for the front wheels 20a for the trailer C. Thus, 50% braking is automatically retained.

In summary, therefore, 50% braking is automatically retained in any event with the system of FIGURE 2.

In the event of failure of either front segment 11 or rear segment 12, the driver will be alerted by the dashboard warning light to have the malfunction repaired.

FIGURE 3.—THE ALL ELECTRIC SYSTEM

In this embodiment of the invention, the trailer D has an all electric braking system. Thus, the wheels 22 are all designated the same and all are simultaneously actuated from the switch 21 through line 19 and disconnect 19a.

In this aspect of the invention, the towing vehicle is the same as previously described. However, the isolation valve is designated 50, 17 because of the fact that either the valve 50 of FIGURE 6 will be preferred, or the valve 17 of FIGURES 4 and 5 can be used.

Where the isolation valve 50 of FIGURE 6 is used, it will actuate a closed hydraulic circuit running from the hydraulically actuated electric controller switch 21 to the isolation valve 50. This circuit is not directly connected to either side of the dual chamber master cylinder 10, shown in FIGURES 1, 2 and 3. Therefore, pressure from either end 11 or 12 acts to move the composite piston 58 of FIGURE 6 so as to actuate the closed hydraulic circuit feeding the electric controller 21, thus applying total brakes 22 for the trailer D. The electric brake controller 21 operates all brakes 22 on the trailer D simultaneously.

Where the valve 17 of FIGURES 4 and 5 is used, however, it operates according to the principle of FIGURE 1. Thus, the valve 17 is connected at one side to end 11 and at the other side by means of a T-fitting 12a to end 12. The outlet line is designated 18e and feeds hydraulic fluid from the end 12 of the auto A to switch 21. Actually, pressure from the end 12 is normally directed to switch 21 in order to operate all of the trailer wheels 22 simultaneously. However, the isolation valve 17 provides an automatic switch over so that if there is a failure in the end 12 of the auto system, pressure from the end 11 will act through a floating piston to be later described, and close the switch 21 for a normal stop. The warning light will tell the driver to have the trouble repaired before proceeding further.

If there is a failure in the front end 11 of the auto A; the rear end 12 will continue to provide normal trailer braking. However, the driver will be alerted to the failure by the warning light to have the malfunction repaired.

THE VALVE.—FIGURES 4 AND 5

In this embodiment, the valve is designated by the reference numeral 17. The valve 17 includes a generally cylindrical body 30 which is initially made open at one end 31, to permit the bore 32 to be carefully finished. The bore 32 receives a floating piston 33, which is of the 2-way type. After the piston 33 is put in position, the open end 31 of the body 30 is sealed with a plug 39, held by a snap ring 42. The plug 39 includes an O-ring seal 40 and bears against a shoulder 41, formed in the bore 32.

The floating piston 33 has flexible seals 34 and 35 at each end which face respectively toward that end. Thus, when pressure is applied against either end of the piston 33, the piston wil be biased or moved in the direction of the pressure applied, but will not bypass fluid to the other side.

The left hand end of the piston 33 cointains a cavity 36 to receive one end of a compression spring 37. The other end of the compression spring 37 bears against a shoulder 38 in bore 32. By this arrangement, the piston 33 is yieldingly urged to its normal, inoperative position shown in FIGURE 4, at the right hand end of the bore 32.

Additionally, the body 30 of the isolation valve 17 includes a port 43 which leads into the cylinder 32 to discharge behind the right end of the piston 33, viewing FIGURES 4 and 5. Referring back to FIGURES 1, 2 and 3, it will be noted that port 43 receives branch line 11 from the front end brake system 11 of the auto A, to receive pressurized hydraulic fluid from that section of the master cylinder 10 that supplies the front brakes 13 and 14 of the auto A.

The body 30 also includes a port 44 which connects into a transverse passage 44a which terminates in an outlet port 48. It will be noted that passage 44a is in communication with cylinder bore 32.

The port 44 has mounted thereon a T-fitting 45 which includes an inlet port 46 and an outlet port 47. The inlet port 46, as shown in FIGURES 1, 2 and 3, is connected to the line 12 to reecive pressurized hydraulic fluid from the section of the master cylinder 10 that supplies the rear brakes 15 and 16 of the auto A.

The T port 47, as shown in FIGURE 1, connects to the line 12 that supplies the rear brakes 15 and 16 of the auto A.

As shown in FIGURE 1, the outlet port 48 is connected to line 18 that leads to the brake system of trailer B, including disconnect 18b and lines 18a. In FIGURE 2, the connection between outlet port 48 and line 18 is the same; but note that only the front brakes of trailer C are actuated hydraulically due to the combination hydraulic-electric brake system on the trailer C.

In FIGURE 3, the outlet 48 is connected to line 18e and thence to electric switch 21.

The isolation valve 17 is adapted for horizontal mounting, as shown by the orientation of FIGURES 4 and 5. A passage 49 is provided at the top of bore 32 to passage 44a to provide for the venting of air from the bore 32 when the system is being purged.

Note, FIGURE 4a, that a check valve 51 is provided on the inside of fitting 45, to operate in passage 44a. As shown in FIGURE 4a, the check valve 51 includes a ball 52, normally biased by spring 54 away from seat 56. The ball 52 rests against a snap ring 60 that is lipped at 60a in order to allow fluid flow past the ball 52 according to the arrow 58.

Under normal brake release pressures, the fluid will flow back around the ball 52 and past seat 56, because the bias of spring 54 is selected to hold the ball off the seat under these pressure conditions. However, at pressures above normal brake release levels, the ball 52 will be closed against the seat 56. This action in the operation of the invention will be brought out below.

OPERATION OF THE INVENTION.—FIGURES 4 and 5

The rest position of the piston 33 is shown in FIGURE 4. Thus, with no pressure being exerted by the dual master cylinder 10 of the auto A of FIGURES 1, 2 and 3, the hydraulic fluid filling the system will be static with forces balanced on both sides of the piston 33. Therefore, the spring 38 will be effective to bias the piston 33 to the right end of the cylinder bore 32, as shown in FIGURE 4.

When the brakes of the auto A are applied, the dual master cylinder 10 will simultaneously pressurize both ends 11 and 12. This means that the condition of FIGURE 4 will remain static, since the pressures on both sides of the piston 33 are balanced. Under this balanced condition, the spring 37 will hold the piston 33 to the right, as in FIGURE 4. By this arrangement, the cylinder 32, to the left of the piston 33 is retained full of hydraulic fluid from the side 12 of master cylinder 10 and this provides the reservoir reserve referred to in the previous description.

In the event of a failure in the end 11, i.e., through port 43 and on the right side of piston 33, the braking function to the trailer brakes through the outlet 48 will continue in the normal manner because the piston 33 is bottomed against the plug 39 and normal pressure is retained in the system. However, the driver of the auto A will be alerted to the failure in the front end system 11 of the auto and should attend to the malfunction as soon as reasonably possible.

In the event of a failure on the end 12 of the master cylinder 10, which end 12 normally supplies pressurized fluid to the brakes of the trailer, pressure from the end 11 of the system through the port 43 and against the right side of piston 33 will be brought into play. This pressure is greater than brake release pressure and therefore closes the check valve ball 52 against the bias of spring 54, causing the ball to close against the seat 56. This will cause the piston 33 to be forced to the left, to assume the position of FIGURE 5. The reservoir fluid on the left side of the piston 33, FIGURE 4, is moved into the brake system of the trailer through the port 48, to provide a normal stop.

When the brakes are released, however, the return springs in the brake cylinders of the trailer wheels will return the fluid past the ball 52 and thus the one "final" shot is dissipated. This means that the driver must heed the warning light signal provided as a result of the brake failure and immediately have the trouble repaired before proceeding further.

THE VALVE.—FIGURE 6

In this embodiment the valve is designated by the reference numeral 50. This valve 50 also includes a generally cylindrical housing 52 which is open at the right end 54 to permit the cylindrical bore 56 to be carefully finished. The cylinder 56 receives a floating piston 58, which is a combination of two pieces, a primary piston 66 and a secondary piston 68, as distinguished from the single piece piston 33 of FIGURES 4 and 5. The function of the valve 50, however, embodies a principle of operation that is analogous to that principle enumerated for the embodiment of FIGURES 4 and 5, but with subtle distinctions which will become apparent. After the piston 58 is put into the cylinder 56 the open end 54 of the housing 52 is sealed by a seal plug and O-ring 60, held in place by a snap ring 62, fitting in a continuous slot 63, to hold the seal plug against a shoulder 64.

The piston 58 comprises a primary piston 66 and a secondary piston 68. The primary piston 66 has a stepped diameter, the larger portion or head 70 of which is of a diameter mating to the cylinder wall 56. An O-ring seal 72 is provided in a groove 73 around the head 70. The head 70 includes a recess 74 to receive one end of spring 76, the other end of which engages a shoulder 78 to bias the combination piston 58 to the right as in FIGURE 6.

The right end of the primary piston 66 is stepped down to a smaller diameter 80 which slides within a bore 82 of the secondary piston 68. A piston-to-piston O-ring seal 84 is provided on the smaller diameter 80 to seal against the bore 82 of the secondary piston 68.

The secondary piston 68 is annular in shape and, as mentioned, the bore 82 receives the reduced diameter portion 80 of the primary piston 66. The outside diameter of the secondary piston 68 is of a size to matingly engage the cylinder wall 56. A groove 86 around the outside receives an O-ring 88 which seals against the cylinder wall 56.

The left hand end of the secondary piston 68 has an annular ring 90 to provide a small gap between the left end and the primary piston 66.

Additionally, the body of the isolation valve 50 includes a port 92 which leads into the cylinder 56 to discharge behind the right end of the secondary piston 68. This port 92 is connected to the front chamber 11 of the master cylinder 10 of FIGURE 3.

The body 52 of the valve 50 also includes a port 94 which leads via passage 96 to the gap between the primary piston 66 and the secondary piston 68. This port 94 is connected to the rear chamber 12 of the master cylinder 10, as shown in FIGURE 3.

The isolation valve 50 is adapted for horizontal mounting, as shown by the orientation of FIGURE 6. A bleeder and fill screw 98 in port 100 is provided in order to fill and vent the cylinder 56.

Note the omission of a check valve from this valve 50, as distinguished from the valve 17 of FIGURES 4 and 5.

The outlet 102 leads to an electric brake control 21 as shown in FIGURE 3 of the drawings.

Note that the stroke of primary piston 66 and the bore 56 are limited to three times the volume of the electric brake controller piston, in the switch 21.

It will be noted in this system that the electric brake switch has its own small charge of hydraulic fluid and the master cylinder 10 is completely isolated from either side of the valve 50. Since the brakes are electrically operated, only a control amount of hydraulic fluid is used.

OPERATION OF THE INVENTION.—
FIGURES 6, 7 AND 8

The rest position of the primary and secondary pistons 66 and 68 is shown in FIGURE 6. Thus, with no pressure being exerted by the dual master cylinder 10 of the auto A of FIGURE 3, the hydraulic fluid filling the system will be static with forces balanced on both sides of the primary and secondary pistons 66 and 68. Therefore, the spring 76 will be effective to bias the pistons 66 and 68 to the right end of the cylinder bore 56.

When the brakes of the auto A are applied, the dual master cylinder 10 will simultaneously pressurize both ends 11 and 12, FIGURE 3. This means that fluid under balanced pressure will enter the ports 92 and 94. This will balance the pressure on both sides of the secondary piston 68 and the secondary piston will not be moved. However, the primary piston 66 will be moved to the left because the left side of the primary piston is under lower pressure. Thus, the condition of FIGURE 7 will be effected and the electric brake control will be actuated in the normal manner.

In the event of failure in the front brake end 11, i.e., through port 92 and on the right side of the secondary piston 68, the braking function to the trailer brakes through the outlet 102 will continue in the normal manner because the secondary piston 68 is bottomed against the seal plug 60 and normal braking action is retained in the system.

However, the driver of the auto will be alerted to the failure in the front end system of the auto, by his warning light, and should attend to the malfunction as soon as reasonably possible.

In the event, however, of a failure on the end 12 of the master cylinder 10, pressure from the end 11 of the master cylinder through the port 92 will be brought into play. This is shown in FIGURE 8. Thus, pressure through port 92 will be greater on the right side of secondary piston 68, because of the failure through port 94 and the secondary piston will be moved to the left, carrying the primary piston 66 with it to produce, in effect, a normal braking action. The trailer does not know the difference.

When the brakes are released, the return spring 76 will move the primary and secondary pistons 66 and 68 back to the position of FIGURE 6, and this action can be repeated as often as desired. However, the driver of the auto will be alerted to the failure in the rear end system of the auto and should attend to the malfunction as soon as reasonably possible.

It will be observed, however, that this system will continue to function after a failure in the rear end system 12, i.e., through port 94 as compared to the one shot system of the embodiment of FIGURES 4 and 5 and this is made possible because the hydraulic fluid is a control medium in FIGURES 6, 7 and 8, relative to the electric switch, as compared to the actual brake actuating force of the embodiment of FIGURES 4 and 5. Thus, this comparison is not meant to favor the system of FIGURES 4 and 5 or vice versa, the embodiment of FIGURES 6, 7 and 8, but is meant to highlight the favorable characteristics of each.

OPTIONAL PISTON ARRANGEMENT—FIGURE 6a

In addition to the piston arrangement shown in FIGURES 6–8 for the valve 50, the arrangement of FIGURE 6a can be employed.

Thus, the floating piston is designated 104, which is also a combination of two pieces. However, there is no interfitting arrangement between the primary piston 106 and the secondary piston 108 as compared to FIGURE 6. This eliminates the extension 80 and the O-ring 84, shown in FIGURE 7.

Thus, in this embodiment, the primary piston 106 has a flat back surface 110 and a spring cup 112 at the front side to receive the return spring 76. An annular groove 114 receives an O-ring 116 which provides a seal to the bore 56. The secondary piston 108 can be identical to the primary piston 106 and includes an annular lip 118 at the front (left) side to provide a gap 120 between it and the primary piston. Thus, fluid can flow through the port 96 into the gap 120. By this arrangement the primary piston 106 will be forced to the left for brake actuation, as described above. Otherwise the valve is identical to that shown in FIGURE 6.

This embodiment provides an economic advantage because of the omission of the O-ring 84 of FIGURE 7, and by the fact that the primary and secondary pistons 106 and 108 can be produced identically.

EXTENDED SCOPE OF THE INVENTION

The foregoing disclosure has alluded to an automobile pulling a trailer, such as a house trailer. The extended scope of the invention is, however, applicable to heavy highway cargo vehicles, such as tractor-trailer rigs where the tractor employs a split hydraulic system:

I claim:
1. In a brake system for a highway trailer having brakes and actuating means for said brakes, and said trailer adapted to be towed by a vehicle having a split hydraulic brake system utilizing a dual master cylinder, and two conduit means connecting said dual master to the front and rear brakes, respectively, of said vehicle,
  isolation valve means interposed between said two conduit means and including a floating piston isolating the two conduit means from one another, each conduit means being connected to one side of said piston,
  said valve means including a check valve connected to one of the conduits, and passage means communicating with said piston operable to transfer fluid pressure from the other conduit means of said split system to said actuating means for at least part of the brakes of said trailer.
2. The invention of claim 1 wherein said isolation valve includes means operable on failure of one end only of said vehicle system to utilize pressure from the other end of said vehicle system to operate said actuating means for the brakes of said trailer.
3. The invention of claim 1 wherein said isolation valve includes a housing having a cylindrical bore receiving said floating piston, closed at one end and open at the other end, and closure means in the open end,
  means in said bore normally biasing said piston toward said open end, and away from said closed end,
  a first inlet port in said housing and into said bore at said open end,
  a second inlet port in said housing on the other side of said piston,
  and said passage means comprising an outlet port in said housing connected to the closed end of said bore.
4. The invention of claim 3, wherein said piston is a one-piece unit and wherein said second inlet port in said housing opens into the closed end of said bore,
  and said check valve means is in said inlet port to the closed end of said bore and is effective to pass fluid in reverse direction from said inlet at pressures below a selected pressure level, but effective to check flow in reverse direction from said inlet at pressures above said selected pressure level.
5. The invention of claim 4 wherein said check valve means comprises a valve seat in said inlet port facing in the direction of inlet, a fluid-pervious retainer spaced from said seat, a ball between said retainer and said seat and adapted to close against said seat,
  and a spring between said seat and said ball normally biasing said ball away from said seat.

References Cited

UNITED STATES PATENTS

| | | | |
|---|---|---|---|
| 2,952,244 | 9/1960 | Krauss et al. | 244—85 XR |
| 3,120,787 | 2/1964 | Schmitt | 244—85 XR |
| 1,617,736 | 2/1927 | Arnold. | |
| 1,908,505 | 5/1933 | Boughton et al. | 303—84 X |
| 3,275,381 | 9/1966 | Pfeifer | 303—7 |

FOREIGN PATENTS

| | | |
|---|---|---|
| 11,268 | 5/1914 | Great Britain. |

MILTON BUCHLER, *Primary Examiner.*

J. J. McLAUGHLIN, JR., *Assistant Examiner.*

U.S. Cl. X.R.

188—151, 152; 303—2, 9, 13, 84